Oct. 24, 1967  R. F. NOWAK  3,348,481
TRAVELING INKING ROLL SUPPORTING SYSTEM
Filed March 10, 1965  6 Sheets-Sheet 6

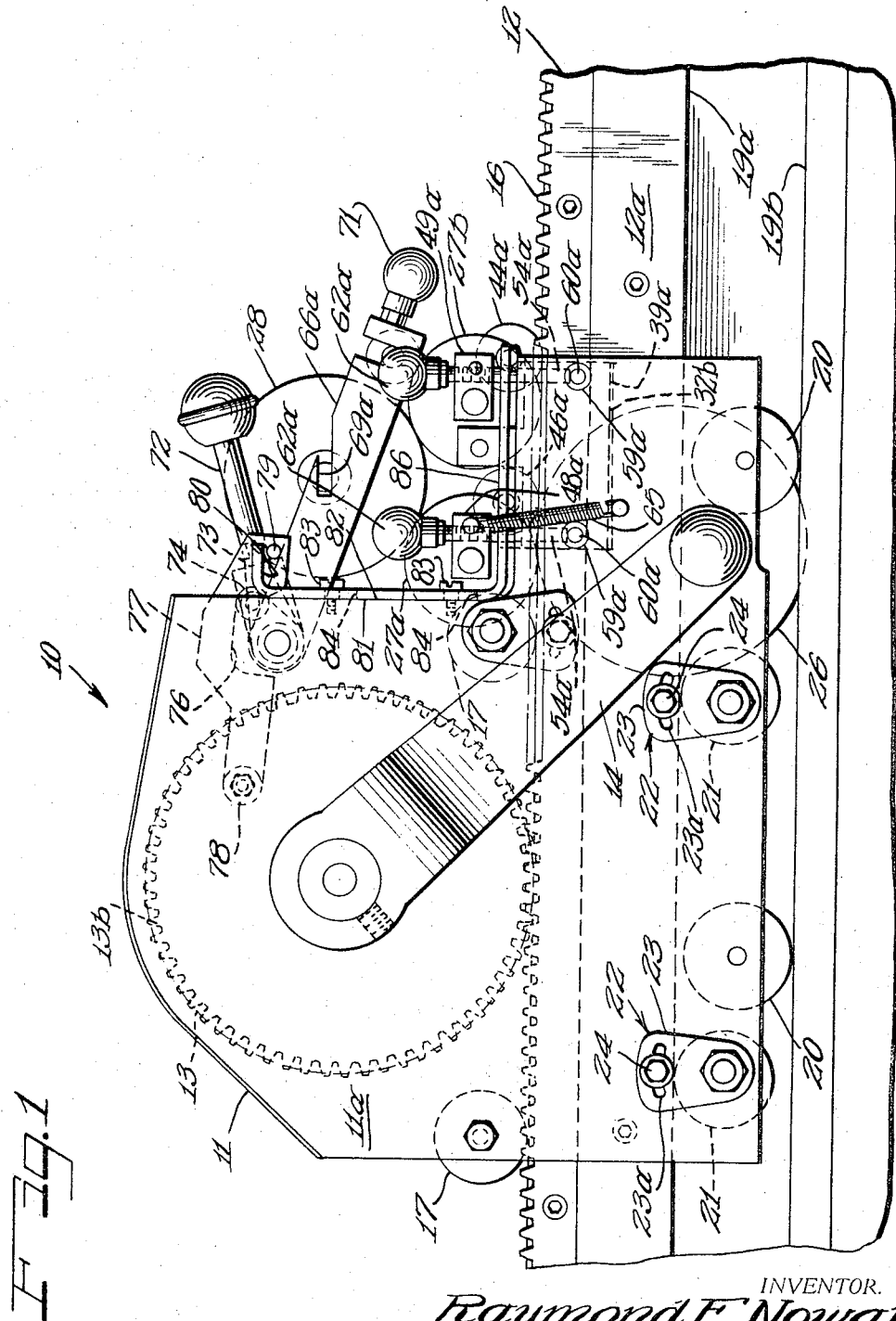

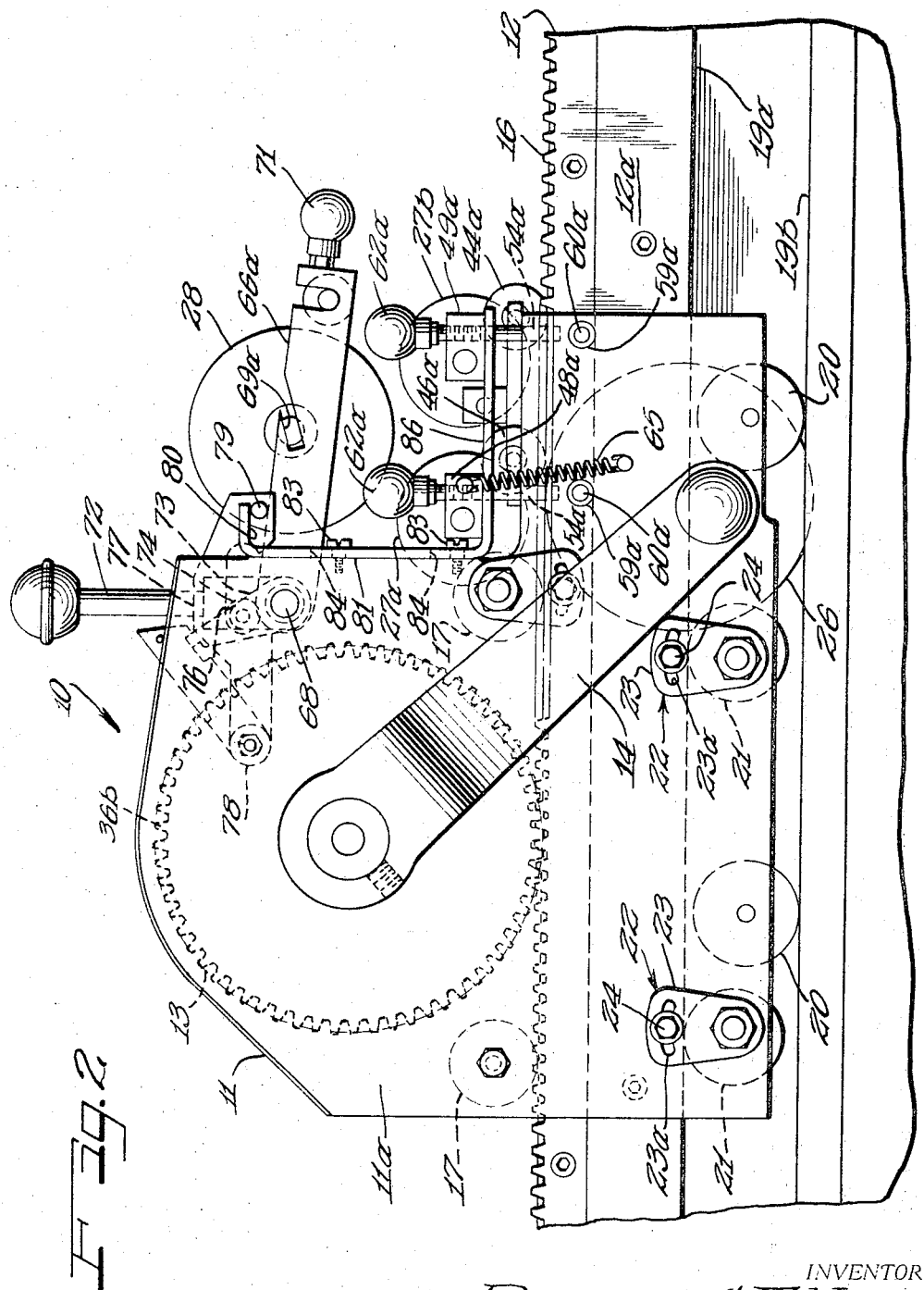

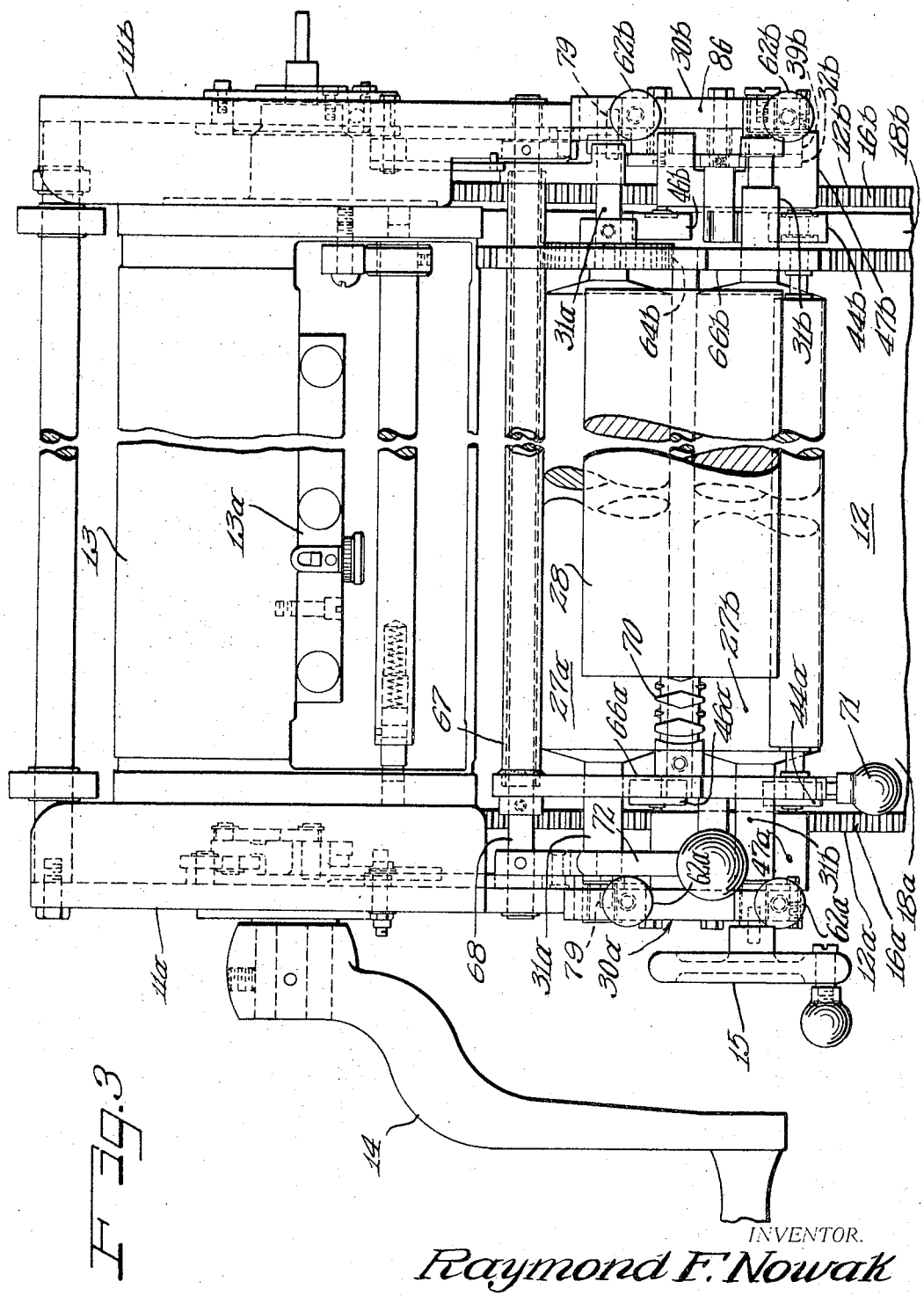

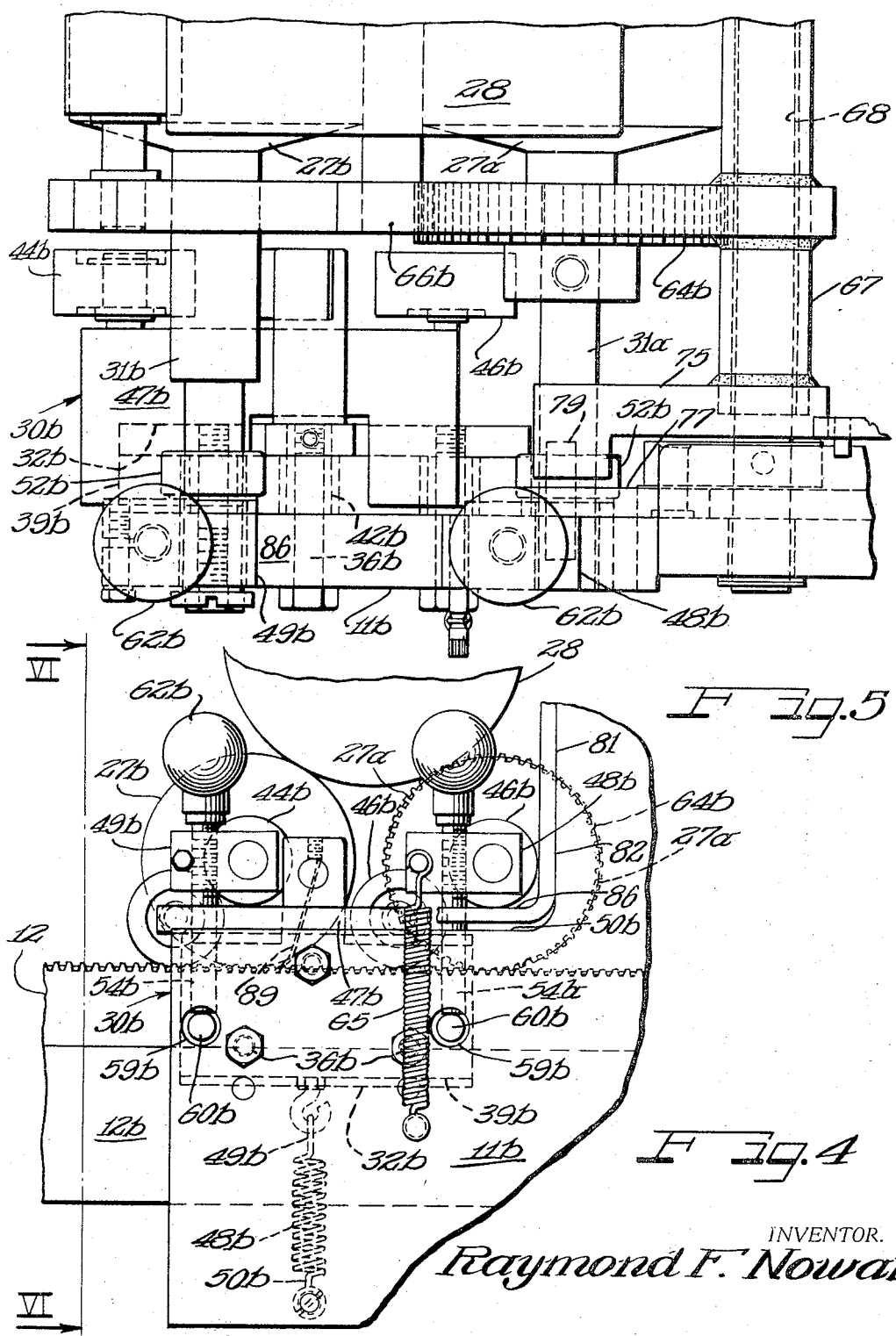

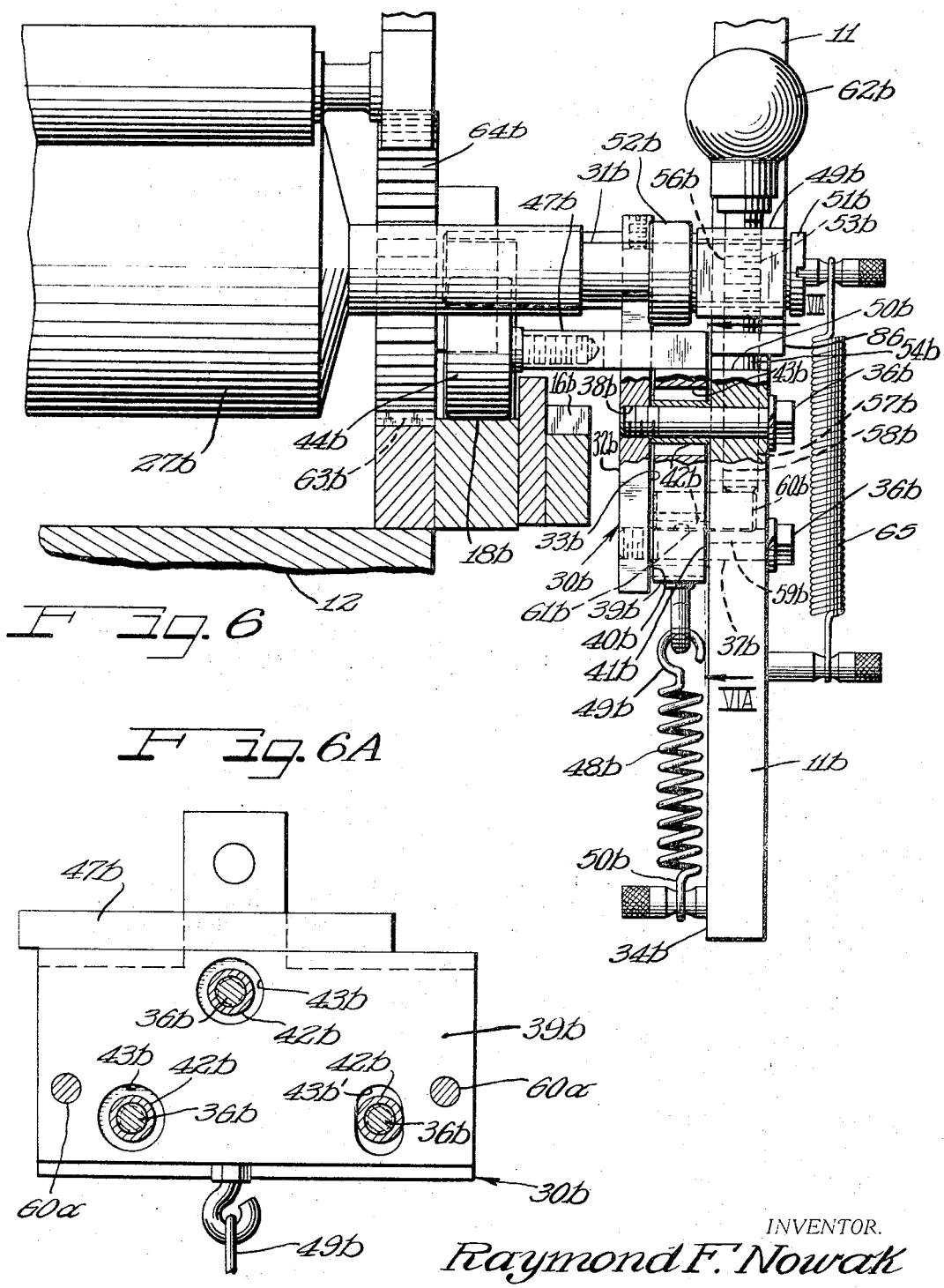

INVENTOR.
Raymond F. Nowak
BY Hill, Sherman, Meroni, Gross & Simpson
ATTORNEYS

United States Patent Office 3,348,481
Patented Oct. 24, 1967

3,348,481
TRAVELING INKING ROLL SUPPORTING SYSTEM
Raymond F. Nowak, Mundelein, Ill., assignor to Vandercook & Sons, Inc., Chicago, Ill., a corporation of Illinois
Filed Mar. 10, 1965, Ser. No. 438,592
8 Claims. (Cl. 101—354)

ABSTRACT OF THE DISCLOSURE

A horizontal flat bed printing press having a carriage mounted on wheels for engagement with a track along the length of the bed. Carriers, separate from the carriage, are also mounted on wheels engageable with the track and rotatably support the form rollers of the press. A mechanical linkage interconnects the carriage and the carriers so that the carriers are moved longitudinally along the bed by the carriage but are able to move vertically independently of the carriage such that vertical movement of the carriage will not affect the vertical disposition of the form rollers. Threaded studs interconnecting the form roller bearings and the carriers enable the form rollers to be selectively vetically positioned relative to the carriers.

---

This invention relates to an inking roller system and more particularly to an inking system for a proof press of the type including a form-supporting bed and a carriage reciprocable along the bed.

In this type of press, a pair of form rollers are mounted in the carriage and are adapted to apply ink to a form supported in the bed as the carriage is moved in one direction. An impression cylinder is also supported by the carriage and is adapted to carry paper to be impressed against the form after ink is applied thereto by the form rollers. To apply ink to the form rollers, one of the rollers may engage an inking drum mounted within the press bed and an axially reciprocable vibrator or distributor roll may be mounted above the form rollers to engage both of the form rollers. The inking drum may be driven manually or by suitable motor means to cause transfer of ink from one roller to another, and the vibrator roll ensures uniform distribution of the ink on the form rollers.

For satisfactory operation of this type of press, it is essential that the vertical position of the form rollers be accurately controlled in relation to the forms in order to properly apply ink thereto. In prior arrangements it has been a difficult and time-consuming opeation to properly adjust the vertical positions of the form rollers in the first instance, and then to maintain such positions during operation of the press. For example, in one previous arrangement the ends of the form roller shafts are journalled in a first pair of bars supported from a second pair of bars, the second pair of bars being supported on a pair of rods journalled in the carriage in positions parallel to the roller axes. Each of the first pair of bars is secured to one of the second pair by a pair of spaced screws, with a third screw intermediate the pair of screws. By adjustment of the three screws, the vertical positions of the form rollers may be adjusted at each side of the carriage. However, such is a very difficult operation, particularly since the adjustment of the vertical position of one form roller affects the adjustment of the vertical position of the other.

A further disadvantage of known arrangements has been that since the form rollers are carried by the carriage, any vertical movement of the carriage as it traverses the form has the effect of imparting such vertical movement to the form rollers, thereby disrupting the pre-set vertical positioning of the form rollers.

An important object of this invention is to provide an inking roller system in which the positions of the form rollers can be readily and accurately adjusted to obtain proper contact with the forms.

Another object of the present invention is to provide an inking roller system in which the rolls or rollers may be made readily accessible for cleaning or inspection.

According to an important feature of this invention, the form rollers are supported on the press bed independently of the carriage by means of a pair of form roller carriers each of which includes two independent devices to provide individual adjustment of the vertical position of each roller. The carriers are connected to the carriage, however, in such a manner as to be moved horizontally reciprocally on the bed by the carriage. As a result, although the carriers are connected to the carriage for horizontl movement, they are adapted so as to move vertically independently of the carriage.

It is, therefore, another object of the invention to provide an inking roller system wherein the form rollers are moved horizontally along the press bed together with the carriage but move vertically independently of the carriage so that any vertical movement of the carriage as it traverses the form will not be imparted to the form rollers.

Yet another object of the invention is to provide an inking roller system in which the form rollers can be adjusted vertically independently of the carriage and such adjustment can be preserved when once made, and which is efficient and reliable in operation and yet easily constructed from a minimum number of component parts.

Many other features, advantages and additional objects of the present invention which reside in certain arrangements and combination of parts will become manifest to those versed in the art upon making reference to the detailed description which follows and the accompanying sheets of drawings, in which preferred structural embodiments incorporating the principles of the present invention are shown by way of illustrative example only.

In the drawings:

FIGURE 1 is a fragmentary side elevational view of the carriage end of a proof press constructed in accordance with the principles of the present invention and illustrates the vibrator or distributor roller and the form rollers in lowered or operative positions;

FIGURE 2 is similar to FIGURE 1 but shows the vibrator roller and the form rollers in raised or inoperative positions;

FIGURE 3 is a top plan view of the structure of FIGURE 1;

FIGURE 4 is a side elevational view of the form rollers and the form roller mounting or supporting assembly as viewed from the righthand side of FIGURE 3;

FIGURE 5 is an enlarged top plan view of the structure of FIGURE 4;

FIGURE 6 is a cross-sectional view taken substantially along lines VI—VI of FIGURE 4 with certain parts shown in elevation and other parts removed for the sake of clarity;

FIGURE 6A is a side elevational view of a center carrier plate of the invention as taken along lines VIA—VIA of FIGURE 6;

As shown in the drawings:

Figure 7:
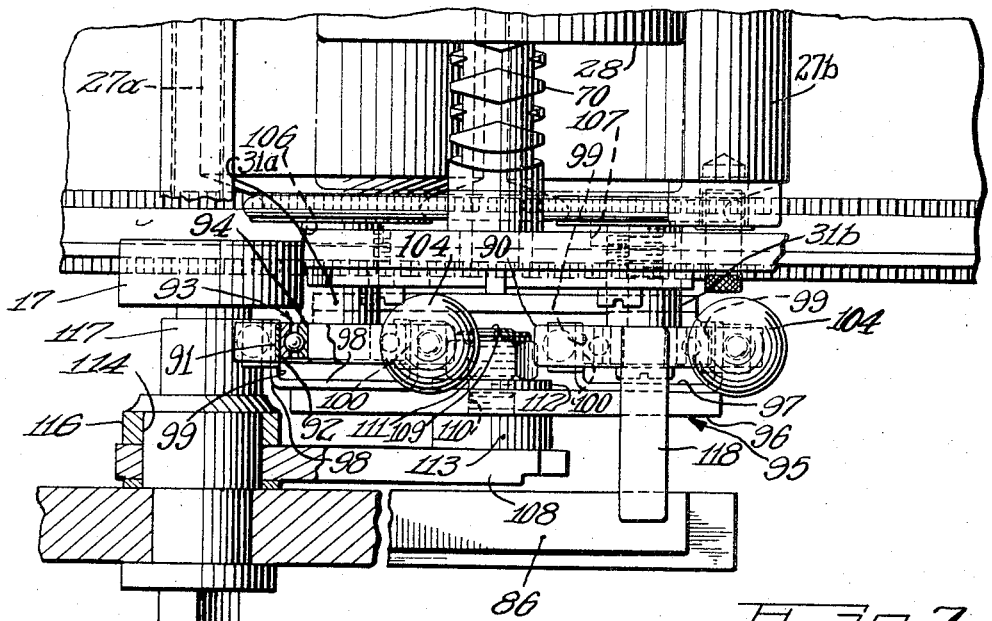
FIGURE 7 is a top plan view similar to FIGURE 5 but showing another form of the invention.

Reference numeral 10 generally designates a proof printing press constructed in accordance with the principles of this invention, which includes a carriage 11 mounted for reciprocable movement along a form-supporting elongated horizontally extending bed 12, only a broken away portion of the bed 12 being illustrated in the drawings. The carriage 11 carries an impression cylinder 13, to which a sheet of paper may be attached by means of a clamping arrangement 13a (FIGURE 3) for engagement with a form (not shown) supported on the bed 12. A crank 14 may be attached to the cylinder 13 for rotating the same, and a pair of gears as at 15 mounted respectively on opposite ends of the cylinder 13 engage respectively a pair of gear racks 16 formed respectively on the bed 12 along two longitudinal sides 12a and 12b thereof to cause movement of the carriage 11 along the bed 12.

In order to guide and to provide easy reciprocable movement of the carriage 11 back and forth on the bed 12 a plurality of wheels 17 are mounted on a pair of carriage plates 11a and 11b which comprise the end or side walls of the carriage 11. The wheels 17 engage and are supported by a pair of spaced parallel guide track means 18a and 18b which extend respectively longitudinally along the bed 12 laterally inwardly of the gear racks 16a and 16b.

In order to maintain the carriage 11 in a predetermined position both vertically and horizontally with respect to the bed 12 as it moves back and forth along the bed, a pair of vertically spaced parallel longitudinally extending upper and lower shoulders or guide ways 19a and 18b are formed along both of the longitudinal sides 12a and 12b of the bed 12. A plurality of longitudinally aligned wheels as at 20 are mounted on each of the carriage plates 11a and 11b to be supported and guided by the pair of lower guide ways 19b. Another set of wheels as at 21 are also mounted on each of the carriage plates 11a and 11b by means of a plurality of wheel mounts 22 and are arranged to engage a pair of upper guide ways 19a. The mounts 22 which journal the wheels 21 are each provided with an eccentric arrangement including a bracket 23 having a downwardly curved slot 23a formed therein and a bolt 24 which extends therethrough for moving the wheels 21 into snug abutting engagement with the upper guide ways 19a.

The ink supply system for inking the form comprises an inking drum 26 which extends transversely to the bed 12 and is rotatably mounted thereon at one end of the bed called the "carriage end" on a pair of fixed journals. A quantity of ink is applied to the surface of the drum 26 and is thereafter transferred to a pair of form rollers 27a and 27b, which serve to ink the form as the carriage 11 traverses the bed 12, and which are situated on spaced axes which extend parallel to the axis of the inking drum 26.

When the carriage 11 is situated at the "carriage end" of the bed 12, as illustrated in FIGURES 1 and 2, form roller 27a is in contact with the inking drum 26 and as the drum 26 is rotated either manually or by suitable motor means some of the ink on the drum is transferred to the form roller 27a. An axially reciprocable vibrator or distributer roller 28 is mounted on the carriage 11 above the form rollers 27a and 27b and engages both of the rollers. Thus, after the inking drum and the various rollers have been in rotatable engagement for an interval of time the ink is evenly distributed on the rollers.

In operation of the press 10, as the crank 14 is turned to move the carriage 11 forwardly along the bed 12 the impression cylinder 13 and the paper wrapped therearound traverses and rolls across the form supported on the bed. It is necessary that a relatively high pressure be exerted on the form by the impression cylinder in order to produce favorable printing on the paper. It will be appreciated that the impression cylinder must be maintained in a proper vertical position with respect to the form as it traverses the form, and a a result of the high pressure which must be exerted on the form by the impression cylinder 13 there is a tendency for the carriage 11 to move slightly vertically upwardly as the impression cylinder 13 is rolled across the form.

In order to minimize this vertical movement or "rocking" of the carriage 11 the mounts 22 which journal the carriage wheels 21 on the carriage plates 11a and 11b are adjusted so that wheels 21 are brought into snug engagement with the upper guide ways 19a and wheels 20 are brought into snug engagement with the lower guide ways 19b.

However, in spite of the effect of the guide wheels 20 and 21 in reducing rocking of the carriage, the impression cylinder 13 still has a tendency to rise very slightly as it is rolled across the form, thereby tending to move the entire carriage 11 slightly vertically upwardly.

In prior art arrangements the form rollers 27a and 27b are mounted on the carriage 11 such that the slight vertical movement imparted to the carriage as the impression cylinder engages the form also moves the form rollers slightly vertically upwardly. Such change in the vertical disposition of the form rollers with respect to the form tends to reduce the constancy of the thickness of the layer of ink applied thereto along the length thereof, thereby reducing the quality of the printing.

An important feature of the invention resides in the provision of means for supporting the form rollers whereby the rollers are moved horizontally along the bed 12 together with the carriage 11, but are free to move vertically independently of the carriage. As a consequence the above mentioned slight vertical movement of the carriage as the impression cylinder engages the form does not affect the vertical disposition of the form rollers and a uniform coating of ink is applied to the form along the entire length thereof.

In one form of the invention, as shown in the exemplary embodiment of FIGURE 3, a pair of form roller carriers indicated generally at 30a and 30b are situated respectively in generally vertically upright positions at the opposite longitudinal sides 12a and 12b of the bed 12 for journalling the form roller shafts, which are indicated at 31a and 31b, and are linked or connected to the carriage 11 for guiding the shafts horizontally along the bed 12 as the carriage and the form rollers traverse the bed.

Form roller carrier 30b only will be described in detail since carriers 30a and 30b are substantially similar, one being essentially a mirror image of the other. As best seen in FIGURES 4–6 carrier 30b comprises an inner carrier plate 32b situated toward the center of the bed 12 or laterally inwardly with respect to the carriage plate 11b. Carrier plate 30b has a flat vertical wall 33b situated in parallel relation to a flat vertical inner wall 34b of the carriage plate 11b and spaced a given distance therefrom.

The inner carrier plate 32b is connected in fixed assembly to the carriage plate 11b by means of a plurality of bolts 36b which extend transversely through a plurality of complemental bores 37b formed in the carriage plate 11b and which are threadedly received in a plurality of coaxially aligned threaded bores 38b formed in the inner carrier plate 32b. It will be appreciated that the inner carrier plate 32b is therefor rigidly and relatively immovably fastened to the carriage plate 11b.

A center carrier plate 39b is disposed between the carriage plate 11b and the inner carrier plate 32b and comprises a pair of flat parallel vertical walls 40b and 41b, with the distance therebetween being just slightly less than said given distance between the facing vertical walls of the carriage plate 11b and the inner carrier plate 32b such that the center carrier plate 39b is freely movable in a vertical plane relative to the carriage plate 11b and the inner carrier plate 32b, but is prevented from sloping or canting in a transverse direction, that is about an axis parallel to the longitudinal axis of the bed.

In order to maintain proper spacing between the facing vertical walls of the carriage plate 11b and the inner carrier plate 32b, a plurality of sleeves 42b are mounted on the bolts 36b between the carriage plate and the inner carrier plate and have an axial length equal to said given distance between walls 33b and 34b.

As best seen in FIGURE 6A the center carrier plate 39B has formed therein a plurality of transverse bores or passages extending therethrough as at 34b for receiving the bolts 36b and the sleeves 42b mounted thereon. The bores 43b each have a vertical dimension which is greater than the vertical dimension of their respective sleeves 42b to enable the center carrier plate 32b to be moved vertically with respect to the bolts 36b and the carrier plate 11b. However, at least one of the passages 43b, as indicated at 43b', has a horizontal dimension which is substantially equal to the horizontal dimension of the corresponding sleeve 42b to preclude relative horizontal movement between the center carrier plate 39b and the bolts 36b and therefore the carriage 11.

Referring again to FIGURES 4–6, the center carrier plate 39b is guided for movement along the bed 12 by means of a pair of longitudinally aligned wheels 44b and 46b mounted on a laterally inwardly extending top carrier plate 47b for rotation about spaced parallel laterally or transversely extending axes and engageable with and supported by the track 18b formed on the bed 12. The top carrier plate 47b is fixedly mounted to the top of the center carrier plate by suitable fastening means and extends above the gear rack 16b.

In order to maintain the wheels 44b and 46b in constant engagement with the track means 18b a coil spring or the like biasing member 48b is fastened at the top end thereof as at 49b to the center carrier plate 39b and at a bottom end 50b thereof to the carriage plate 11b, thereby imparting a constant vertically downward bias to the center carrier plate 39b and consequently to the wheels 44b and 46b.

Shafts 31a and 31b of the form rollers 27a and 27b are journalled for rotation at both ends thereof by means of independent journal members or blocks which, in the embodiment of carrier 30b illustrated in FIGURES 4–6, comprise a pair of independent journals 48b and 49b disposed above a horizontal top wall 50b of the carriage plate 11b in mutually longitudinally aligned relation. A fastener 51b and a collar 52b are mounted on each of the journals 48b and 49b and their respective shafts 31a and 31b for mounting the shafts on the journals.

In accordance with the principles of the invention the journal blocks for shafts 31a and 31b may be independently vertically adjusted and such adjustment, when once made, is not effected by the slight vertical movement of the carriage 11 as the impression cylinder 13 engages the form on the bed 12 during operation of the press.

Accordingly, a threaded vertical bore 53b is formed in each of the journal blocks 48b and 49b for receiving respectively a stud 54b threaded complementarily at a top portion 56b thereof. A lower portion 57b of each of the studs 54b is not threaded but instead has a smooth peripheral surface to be freely slidably received in a complementarily shaped smooth vertical bore 58b formed in the carriage plate 11b and extending downwardly from the horizontal wall 50b of the carriage plate.

Also formed in the carriage plate 11b are a pair of laterally extending bores or passages as at 59b which are situated respectively immediately subjacent their corresponding vertical bores 58b and in communication therewith. Extending laterally outwardly from the center carrier plate 39b are a pair of protuberances or bosses indicated at 60b received by or extending into the bores 59b and the vertical dimension of each of which is substantially less than the vertical dimension of its corresponding bore 59b to enable the protuberances to be moved vertically in their respective bores.

In the illustrated embodiment the protuberances 60b comprise a pair of short studs each of which is connected in fixed assembly to the center carrier plate 39b by means of a press fit or the like connection into a lateral bore as at 61b. The short studs 60b extend under the bores 58b to provide a vertical stop for the vertical studs 54b housed in the bores 58b.

It will thus be appreciated that the studs 54b, and consequently the journal blocks 48b and 49b and the form roller shafts 31a and 31b, are supported in a vertical direction by the center carrier plate 32b through the protuberances or stops 60b, upon which the lower ends of the studs 54b are bottomed. The journal members 48b and 49b are thus supported vertically independently of the carriage 11.

The journal blocks 48b and 49b, however, are vertically adjustable as a result of the threaded arrangement of the upper part 56b of the studs 54b and the complementarily threaded bore 53b of the journal blocks. Because of the smooth lower portion 57b of the studs 54b, the studs are always bottomed on the protuberances 60b, so that rotation of the studs 54b, for which purpose knobs 62 may be mounted thereon, merely raises or lowers the corresponding journal blocks 48b and 49b without raising or lowering the studs themselves.

Other features of the proof press 10 include a second gear rack 63b formed on the bed 12 laterally inwardly of the first gear rack 16b and extending longitudinally along the bed but terminating at a point approximately above the inking drum 26. A gear 64b is mounted on the form roller shaft 31a in meshing engagement with the gear rack 63b so that when the carriage 11 is moved from the carriage end of the bed 12, whereat the form roller 27a is driven by the inking drum 26, the gear 64b engages the rack 63b to rotate the form roller 27a which in turn rotates the vibrator roller 28 and the form roller 27b. A spring member 65 interconnects the shaft 31a and the carriage 11 in order to maintain a constant downward bias of the gear 64b into meshing engagement with the gear rack 63b.

Other features of the proof press 10 comprise a pair of vibrator roller supporting arms 66a and 66b which are connected in fixed assembly to a hollow transversely extending tubular member 67 which is rotatably mounted on a shaft 68 journalled at opposite ends by the carriage plates 11a and 11b. A pair of slots 69a and 69b are formed respectively in the arms 66a and 66b to receive complementarily shaped end portions of a worm shaft 70 upon which the vibrator roller 28 is mounted. A knob 71 may be mounted on the arm 66a to facilitate pivotal movement of the arms 66a and 66b to manually raise the vibrator roller 28 off of the form rollers 27a and 27b.

An arm 72 is mounted on the shaft 68 in order to rotate the shaft which has mounted thereon adjacent the carriage plates 11a and 11b and in fixed assembly therewith a pair of cams 73 and cam rollers 74. By pivoting the arm 72 counterclockwise as viewed in FIGURE 1 the cam rollers 74, which engage recessed portions 76 formed in a pair of levers 77, rotates the levers 77 counterclockwise about a pair of shafts 78 journalled respectively on carriage plates 11a and 11b. A pair of pins 79 which extend laterally from the levers 77 engage a pair of brackets 79 fixedly connected to the tube 67 to rotate the tube counterclockwise and consequently to raise the vibrator roller 28 to the position shown in FIGURE 2.

Further counterclockwise rotation of the levers 77 causes the pins 79 to engage the bottom surfaces of horizontally extending top end portions 80 of a pair of vertically movable brackets 81 mounted respectively on vertical walls 82 of carriage plates 11a and 11b to move the brackets 81 vertically upwardly.

The brackets 81 are each mounted on vertical walls 82 by means of a pair of screws as at 83 which are received in a pair of corresponding slots 84 formed in the brackets 81, and further comprise lower horizontal end portions 86 which are disposed between the horizontal walls 50a and 50b of the carriage plates 11a and 11b and the journal blocks 48a–b and 49a–b. As a consequence, vertical movement of the brackets 81b raises the form rollers 27a and 27b to a position as shown in FIGURE 2 of the drawings.

The vibrator roller 28 and the form rollers 27a and 27b may be held in the raised positions thereof as shown in FIGURE 2 by means of a latch 87 which is pivotally mounted on one of the shafts 78 and which has a recess 88 formed therein for receiving an end of one of the brackets 77. In the raised positions shown in FIGURE 2 the vibrator roller 28 and the form rollers 27a and 27b may be easily inspected, cleaned and removed from the carriage 11.

In order to maintain the guide tracks 18a and 18b free of dirt, grit and the like a wiper blade 89 is mounted on the center carrier plate 39b to clean the guide tracks as the carriage 11 moves backwardly and forwardly across the bed 12.

Figure 8:
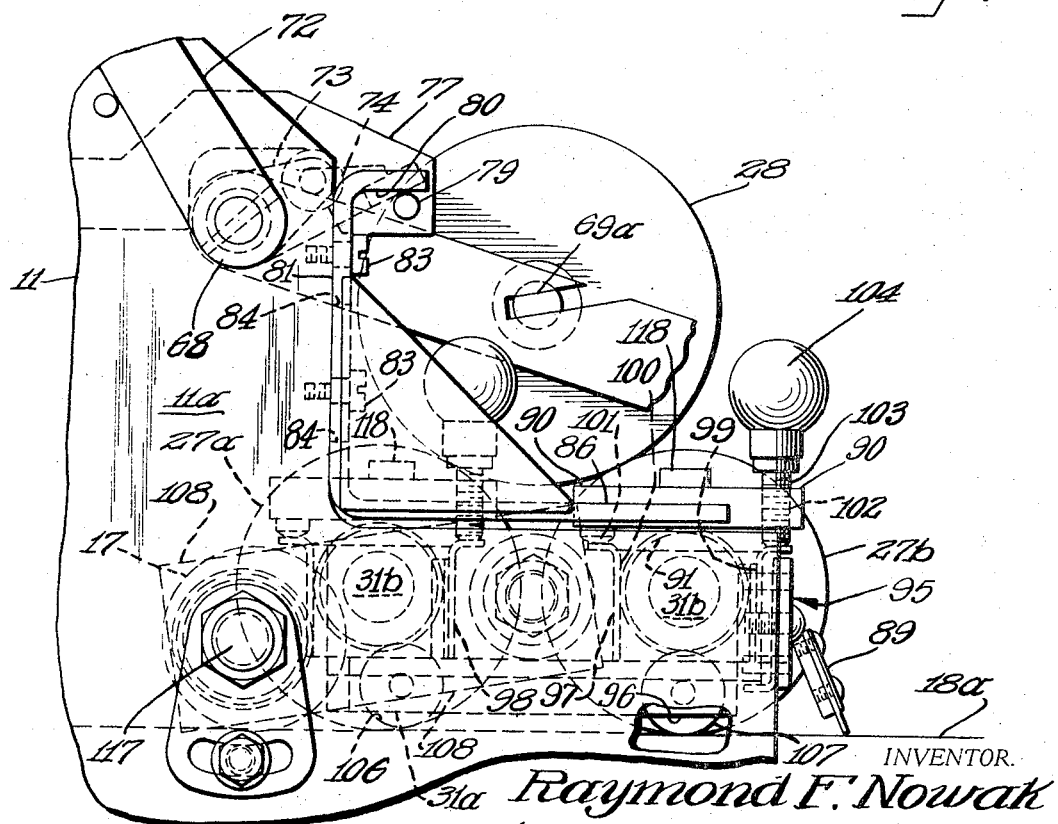
FIGURE 8 is an enlarged side elevational view of the structure of FIGURE 7.

Another form of the invention is illustrated in FIGURES 7 and 8, wherein parts similar to those shown in the other figures are given the same reference characters. In this embodiment a pair of generally vertically upright journal members or form roller carriers are provided at opposite ends of the form rollers 27a and 27b only one of which, indicated generally at 95, is shown because of the similarity of the two. The carrier 95 includes a pair of horizontal bars indicated at 90, 90 having a pair of bearing assemblies being supported from the underside of an intermediate portion of the bars. For example, a ring 91 is welded or otherwise secured to the underside of each of the bars 90 and supports the outer race 92 of a ball bearing assembly 93 having an inner race 94. The inner race 94 is disposed on a reduced diameter portion of its respective form roller shafts 31a and 31b.

A form roller carrier plate as at 96 is disposed at each end of the form rollers and has mounted thereon a pair of blocks as at 97 and 98 having facing vertical surfaces 99 and 100 spaced apart a distance substantially equal to the external diameter of the ring 91, the blocks 97 and 98 being securely fastened to the inside surface of the carrier plates 96.

A screw or pin 101 is secured to the underside of each of the bars 90 adjacent one end thereof (the left end as viewed in FIGURE 8) and rests against the top surface of its respective block 97 and 98 to provide a support which allows generally pivotal movement of the bars 90 about axes parallel to the axis of the rollers 27a and 27b. Adjacent the other end of each of the bars 90 (the right end as viewed in FIGURE 8) an internally threaded opening 102 is provided through which a vertical screw 103 is threaded, the lower end of the screw 103 being engaged with the upper surface of its respective block 97 and 98. A knob 104 is secured to the upper end of each of the screws 103, and it will be appreciated that by rotation of the knobs 104 the bars 90 may be tilted upwardly or downwardly to adjust the vertical positions of the form rollers 27a and 27b.

As noted, the constructions of the carrier device for the opposite ends of the form rollers 27a and 27b are similar and therefor will not be described in detail.

To guide each of the carrier plates 96 and the form rollers 27a and 27b for horizontal movement together with the carriage 11 a pair of longitudinally aligned wheels 106 and 107 are mounted thereon to engage a corresponding guide track as indicated at 18a in FIGURE 8. A driving bar 108 interconnects the carrier plate 96 and the corresponding carriage plate 11a and 11b for moving the carrier plate horizontally together with the carriage 11. One end of the bar 108 has a threaded stud 109 extending laterally inwardly therefrom and through a bore 110 formed in the carrier plate 96. A nut 111 is threaded on the end of the stud 109 together with a washer 112. In order to prevent tilting or canting of the carrier plate 96 about an axis parallel to the longitudinal axis of the bed an enlarged collar 113 is formed on the bar 108 which, in cooperation with the washer 112, maintains in parallel relation the planes in which the carrier plate 96 and the bar 108 reside.

At the other end of the bar 108 a lateral bore 114 extends through an enlarged collar portion 116 thereof to receive and to be pivotally mounted on an eccentric shaft 117 which supports the carriage wheel 17. The collar 116 also prevents tilting of the bar 108 to maintain the bar and the carrier plate 96 in upright positions.

In the embodiment of FIGURES 7 and 8 the vibrator roll 28 and the form rollers 27a and 27b can also be raised for cleaning and inspection purposes in the manner similar to the embodiment illustrated in FIGURE 2, and for this purpose a pair of transverse bars as at 118 are connected in fixed assembly by means of a weld or like connection to the top surfaces of each of the bars 90 and extend across the top of the lower portion 86 of the bracket 81 such that when the arm 72 is raised to the position shown in FIGURE 2 the upward movement of the bracket 81 will lift the bars 90 off of blocks 97 and 98 and will also raise the vibrator roll 28, whereupon the form rollers 27a and 27b and the vibrator roll 28 are disposed in positions similar to those shown in FIGURE 2.

Although minor modifications might be suggested by those versed in the art, it should be understood that I wish to embody within the scope of the patent warranted hereon all such modifications as reasonably come within the scope of my contribution to the art.

I claim as my invention:

1. In a printing press comprising,
   a horizontal longitudinal form-supporting bed,
   track means on the bed situated adjacent the longitudinal sides thereof,
   a carriage carried on said bed and having a pair of spaced carriage plates situated respectively adjacent the two longitudinal sides of the bed,
   wheels on said carriage and engageable with said track means for guiding said carriage horizontally along said bed,
   a pair of form rollers,
   a pair of shafts supporting said form rollers and projecting respectively from both ends of said rollers, and
   a pair of form roller carriers for vertically adjustably supporting and journalling said form roller shafts and situated respectively at the two longitudinal sides of said bed,
   wheels mounted on said carriers and engageable with said track means for guiding said carriers horizontally along said bed,
   means connecting said carriers with said carriage for movement in a horizontal direction together with said carriage and in a vertical direction independently of said carriage, and
   means for selectively adjusting the vertical disposition of said form rollers relative to said carriers.

2. In a printing press comprising,
   a horizontal longitudinal form-supporting bed,
   track means on the bed situated adjacent the two longitudinal sides thereof,
   a carriage carried on said bed and having a pair of spaced carriage plates situated respectively adjacent the two longitudinal sides of the bed,
   wheels on said carriage and engageable with said track means for guiding said carriage horizontally along said bed,
   a pair of form rollers,
   a pair of shafts supporting said form rollers and projecting respectively from both ends of said rollers, and
   a pair of form roller carriers for supporting said form roller shafts and situated respectively at the two longitudinal sides of said bed, each of said carriers comprising,
      a carrier plate,
      wheels mounted on said carrier plate and engageable with said track means for guiding said carrier plate horizontally along said bed, means interconnecting said carrier plate with a corresponding carriage plate situated on the same longitudinal side of the bed therewith for moving said carrier plate in a horizontal direction together with said carriage and in a vertical direction independently of said carriage, journal means carried on said carrier plate for journalling independently of each other one end of both of said form roller shafts, and adjustable means for supporting said journal means on said carrier plate and for providing independent vertical adjustment of said journal means relative to said carrier plate.

3. In a printing press comprising, a horizontal longtiudinal form-supporting bed, track means on the bed situated adjacent the two longitudinal sides thereof, a carriage carried on said bed and having a pair of vertically extending spaced parallel carriage plates situated respectively adjacent the two longitudinal sides of the bed, wheels on said carriage and engageable with said track means for guiding said carriage horizontally along said bed, a pair of form rollers, a pair of shafts supporting said form rollers and projecting respectively from both ends of said rollers, and a pair of from roller carriers for supporting said form roller shafts and situated respectively at the two longitudinal sides of said bed, each of said carriers comprising, a vertically extending stationary plate, a plurality of laterally extending bolts fixedly mounting said stationary plate on a carriage plate corresponding thereto and situated on the same longitudinal side of the bed therewith and in spaced parallel relation thereto a given lateral distance therefrom, a vertically extending movable center plate situated between said stationary plate and said corresponding carriage plate and having a lateral dimension slightly less than said given distance to enable said center plate to be moved only in a vertical plane, means forming a plurality of lateral passages in said center plate receiving respectively therethrough said lateral bolts, said passages having a vertical dimension greater than the vertical dimension of said bolts to enable said center plate to be moved freely vertically with respect to said bolts and at least one of said passages having a horizontal dimension substantially equal to the horizontal dimension of its respective bolt to preclude horizontal movement of said center plate with respect to said bolts, wheels mounted on said center plate nad engageable with said track means for guiding said center plate horizontally along said bed, and journal means carried by said center plate for journalling one end of both of said form roller shafts.

4. In a printing press comprising, a horizontal longitudinal form-supporting bed, track means on the bed situated adjacent the two longitudinal sides thereof, a pair of form rollers extending transversely of said bed, a pair of shafts supporting said form rollers and projecting respectively from both ends of said rollers, four separate journal blocks for journalling respectively the ends of both of said shafts, a carriage carried on said bed and having a pair of carriage plates situated respectively adjacent the two longitudinal sides of the bed, wheels on said carriage and engageable with said track means for guiding said carriage horizontally along said bed, a pair of carrier plates situated respectively on the two longitudinal sides of said bed, wheels on said carrier plates and engageable with said track means for guiding said carrier plates horizontally along said bed, means interconnecting each of said carrier plates with a corresponding carriage plate situated on the same longitudinal side of the bed therewith to move said carrier plates in a horizontal direction together with said carriage and in a vertical direction independently of said carriage, and vertically adjustable means for supporting respectively a pair of said journal blocks on a corresponding carrier plate and for providing vertical adjustment of said journal blocks relative to said carrier plates, whereby the vertical disposition of said journal blocks and said form rollers is independent of said carriage.

5. In a printing press comprising, a horizontal longitudinal form-supporting bed, track means on the bed situated adjacent the two longitudinal sides thereof, a pair of form rollers extending transversely of said bed, a pair of shafts supporting said form rollers and projecting respectively from both ends of said rollers, four separate journal blocks journalling respectively the ends of both of said shafts and each having a vertical threaded bore extending therethrough, four complementarily threaded studs extending respectively through said bores of said journal members, a carriage carried on said bed and having a pair of carriage plates situated respectively adjacent the two longitudinal sides of the beds, wheels on said carriage and engageable with said track means for guiding said carriage horizontally along said bed, a pair of smooth vertical bores formed in each of said carriage plates for slidably reciprocably receiving said studs to maintain said studs in an upright position, a pair of carrier plates situated respectively on the two longitudinal sides of said bed, wheels on said carrier plates and engageable with said track means for guiding said carrier plates horizontally along said bed, means interconnecting each of said carrier plates with a corresponding carriage plate situated on the same longitudinal side of the bed therewith to move said carrier plates in a horizontal direction together with said carriage and in a vertical direction independently of said carriage, and stop means fixedly mounted on each of said carrier plates in said subjacent relation to said studs corresponding therewith to provide a bottoming surface for said studs, whereby the vertical disposition of said journal members and said form rollers is independent of said carriage.

6. In a printing press comprising, a horizontal longitudinal form-supporting bed, first and second guide track means formed on said bed, each of said track means comprising a pair of longitudinally extending spaced parallel tracks situated respectively adjacent the two longitudinal sides of said bed, first and second gear racks formed on said bed and disposed respectively on opposite sides of one of said pair of tracks of said second track means, a pair of form rollers extending transversely of said bed, a pair of shafts supporting said form rollers and projecting respectively from both ends of said rollers, a gear mounted on one of said shafts in meshing relation with said second gear rack, four separate journal members journalling respectively the ends of both of said shafts and each having a vertical threaded bore extending therethrough, four complementarily threaded studs extending respectively through said bores of said journal members, a carriage carried on said bed and having a pair of vertical longitudinally extending carriage plates situated respectively adjacent the two longitudinal sides of said bed, wheels on said carriage and engageable with said first track means for guiding said carriage horizontally along said bed, a pair of smooth vertical bores formed in each of said carriage plates for slidably reciprocally receiving said studs to maintain said studs in a vertical position, a pair of vertical inner carrier plates situated respectively adjacent the laterally inner surfaces of said carriage plates, a plurality of laterally extending bolts interconnecting and fixedly mounting said inner carrier plates on their respective carriage plates a given distance therefrom, a pair of center carrier plates situated respectively between said corresponding pairs of said inner carrier plates and said carriage plates and dimensioned in a lateral direction less than said given distance to enable said center plates to move only in a vertical plane, a plurality of lateral passages formed in each of said center plates for receiving said bolts, at least one of said passages in each of said center plates being dimensioned in a horizontal direction substantially equal to the horizontal dimension of said bolts to preclude horizontal movement of said center plate relative to said bolts and said carriage and all of said lateral passages being dimensioned in a vertical direction greater than the vertical dimension of said bolts to enable said center plate to move vertically relative to said bolts and to said carriage, a pair of lateral bores formed in each of said carriage plates and in communication respectively with said pair of vertical bores formed therein at the lower end thereof, a pair of protuberances formed on each of said center plates and extending respectively into the lateral bores formed in said carriage plates to provide vertical stops for bottoming said studs, a top carrier plate fixedly mounted on each of said center plates above said first gear rack, a pair of longitudinally aligned wheels journalled on each of said top carrier plates and engageable with said second track means for guiding said center carrier plate horizontally along said bed, first spring means interconnecting said form roll having said gear thereon and said carriage for constantly biasing said gear downwardly into meshing engagement with said second gear rack, and second spring means interconnecting respectively said center carrier plates and said carriage for constantly biasing said wheels of said center plate downwardly into engagement with said second track means.

7. In a printing press comprising, a horizontal longitudinal form-supporting bed, track means on the bed situated adjacent the longitudinal sides thereof, a carriage carried on said bed and having a pair of spaced carriage plates situated respectively adjacent the two longitudinal sides of the bed, wheels on said carriage and engageable with said track means for guiding said carriage horizontally along said bed, a pair of form rollers, a pair of shafts supporting said form rollers and projecting respectively from both ends of said rollers, a bearing assembly mounted on each of said shafts at the ends thereof, and a pair of form roller carriers for supporting said form roller shafts and situated respectively at the two longitudinal sides of said bed, each of said carriers comprising, a carrier plate disposed in an upright position and having a pair of longitudinally aligned wheels mounted thereon and engageable with said track means for guiding said carrier plate horizontally along said bed, a pair of blocks mounted on said carrier plate, each of said blocks having a pair of facing spaced vertical surfaces formed thereon for receiving respectively therebetween one of said bearing assemblies for guiding said bearing assembly for vertical movement relative to said carrier plate, and means connecting said carrier plate with a corresponding carriage plate situated on the same longitudinal side of the bed therewith for movement in a horizontal direction together with said corresponding carriage plate and in a vertical direction independently of said carriage plate, said connecting means also being adapted to maintain said carrier plates in said upright position.

8. The printing press as defined in claim 7 and including, adjustable means for selectively independently adjusting the vertical disposition of said bearing assemblies relative to their corresponding carrier plates.

References Cited

UNITED STATES PATENTS

| | | | |
|---|---|---|---|
| 1,985,701 | 12/1934 | Vandercook et al. | 101—269 |
| 2,024,594 | 12/1935 | Mueller | 101—269 |
| 2,181,714 | 11/1939 | Vandercook et al. | 101—354 |
| 2,366,884 | 1/1945 | Tyler | 101—358 X |
| 2,992,609 | 7/1961 | Roozee | 101—354 |
| 3,018,725 | 1/1962 | Maul et al. | 101—269 |

FOREIGN PATENTS 712,543    7/1954    Great Britain.

ROBERT E. PULFREY, *Primary Examiner.*

J. R. FISHER, *Assistant Examiner.*